United States Patent [19]

Filev et al.

[11] Patent Number: 5,631,845
[45] Date of Patent: May 20, 1997

[54] METHOD AND SYSTEM FOR CONTROLLING PHOSPHATE BATH CONSTITUENTS

[75] Inventors: Dimitre P. Filev, Novi, Mich.; Irena A. Nagisetty, Toledo, Ohio; Alan E. Hyrila, Salem, Mich.; John Huff, Southfield, Mich.; Robert A. Sensoli, Livonia, Mich.; John C. Cooper, Dearborn, Mich.

[73] Assignee: Ford Motor Company, Dearborn, Mich.

[21] Appl. No.: 541,387

[22] Filed: Oct. 10, 1995

[51] Int. Cl.⁶ .................................................. G01F 1/00
[52] U.S. Cl. .................. 364/510; 364/497; 364/500; 364/502; 148/242; 148/253; 148/262; 427/435; 427/8; 427/443.1; 427/437
[58] Field of Search ...................... 364/497–499, 364/502, 164, 165, 177, 505, 506, 509, 510, 500; 148/241, 242, 252, 253, 262; 204/238, 275, 276, 402, 404, 405; 427/435, 8, 443.1, 437; 205/791, 96, 82; 62/133, 241, 243; 165/41–44; 395/900, 903, 905, 906, 61

[56] References Cited

U.S. PATENT DOCUMENTS

| | | | |
|---|---|---|---|
| 3,401,065 | 9/1968 | Steinbrecher et al. | 148/241 |
| 3,516,876 | 6/1970 | Hauffe | 148/241 |
| 3,649,509 | 3/1972 | Morawetz et al. | 204/238 |
| 4,089,710 | 5/1978 | Cooke | 148/241 |
| 4,350,717 | 9/1982 | Araki et al. | 427/8 |
| 4,353,933 | 10/1982 | Araki et al. | 427/8 |
| 4,374,681 | 2/1983 | Schueneman | 148/241 |
| 4,515,643 | 5/1985 | Knaster | 148/241 |
| 4,565,585 | 1/1986 | Matsuda | 148/241 |
| 4,623,554 | 11/1986 | Kaschak et al. | 427/8 |
| 4,692,346 | 9/1987 | McBride et al. | 427/8 |
| 4,774,101 | 9/1988 | Harris et al. | 427/8 |
| 4,814,197 | 3/1989 | Duffy et al. | 427/8 |
| 4,838,957 | 6/1989 | Miyamoto et al. | 148/241 |
| 4,897,128 | 1/1990 | Dosch et al. | 148/241 |
| 4,914,924 | 4/1990 | Takahashi | 62/133 |
| 4,933,870 | 6/1990 | Chang | 364/497 |
| 4,961,794 | 10/1990 | Miyamoto et al. | 148/262 |
| 4,974,209 | 11/1990 | Hoult | 364/497 |
| 5,117,370 | 5/1992 | DeCello et al. | 364/497 |
| 5,156,013 | 10/1992 | Arima et al. | 62/148 |
| 5,182,131 | 1/1993 | Hashimoto et al. | 427/8 |
| 5,248,577 | 9/1993 | Jerome | 364/165 |
| 5,336,380 | 8/1994 | Phan et al. | 204/153.1 |
| 5,352,350 | 10/1994 | Andricacos et al. | 205/101 |
| 5,368,715 | 11/1994 | Hurley et al. | 205/82 |
| 5,410,470 | 4/1995 | Yamaoka et al. | 364/165 |
| 5,427,313 | 6/1995 | Davis, Jr. et al. | 236/49.3 |

OTHER PUBLICATIONS

Mizumoto, "Min–max–gravity method versus product–sum–gravity method for fuzzy controls", published in Proceedings of the 4th IFSA Congress, Brussels, 1991, pp. 127–1310.

Yager and Filev, "Essentials of Fuzzy Modeling and Control", published by John Wiley & Sons, Inc., 1994, p. 141.

Dohmann, Edgar, "Fuzzy Logic Control of a Chemical Bath", IEEE, 1994, pp. 958–961.

Primary Examiner—Emanuel T. Voeltz
Assistant Examiner—Hal D. Wachsman
Attorney, Agent, or Firm—Damian Porcari; Roger L. May

[57] ABSTRACT

A phosphate bath control system and method is provided that tracks the set points of one or more of the major process variables of the phosphate bath independently of variations in the production conditions. A detector determines the current values of Zinc, Manganese and Total Acid provides data to a controller which exponentially filters the data and processes the filtered data in accordance with fuzzy logic rules. The controller periodically updates the flow rate of one or more pumps that control the flow of liquid concentrates to the bath in order to maintain a desired concentration of the various constituents of the bath. Control of an accelerator is provided by incorporating in the controller an additional algorithm for indirect estimation of the accelerator concentration based on a math model which represents the material balance of the accelerator in the bath.

20 Claims, 7 Drawing Sheets

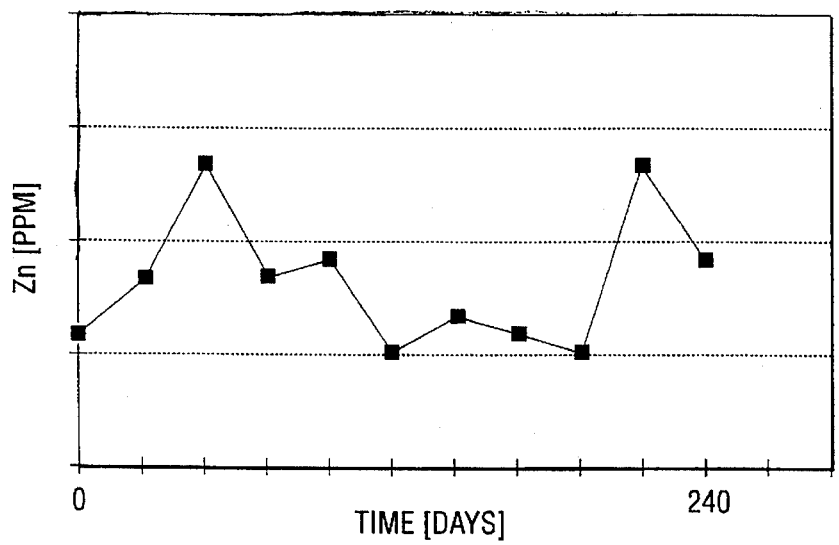
Fig. 1 (PRIOR ART)
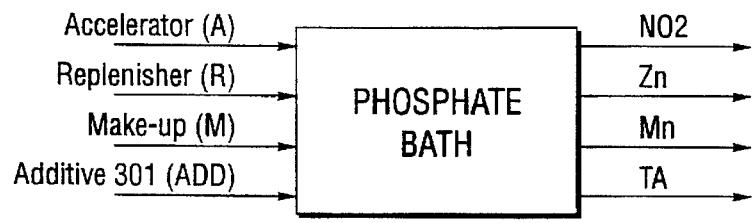
Fig. 2
Fig. 3
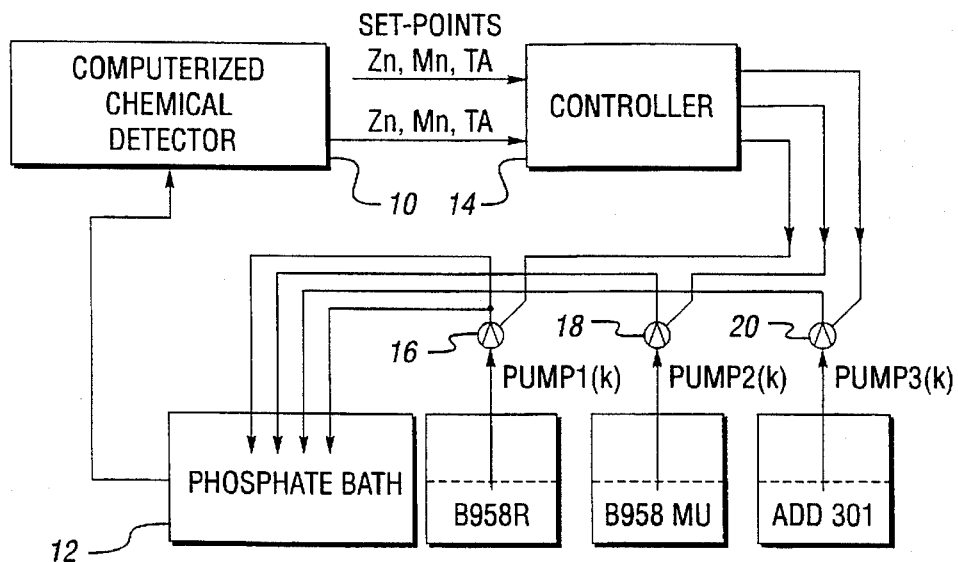

METHOD AND SYSTEM FOR CONTROLLING PHOSPHATE BATH CONSTITUENTS

TECHNICAL FIELD

This invention relates to continuous control of the major constituents of a phosphate bath and, more particularly, to an on-line phosphate bath control system using a fuzzy logic controller to control the flow rate of one or more pumps controlling the addition of liquid concentrate to the bath.

BACKGROUND ART

It is a well established practice in the automotive industry to apply an acidified zinc phosphate solution to metal car bodies to form a zinc phosphate coating on the metal surfaces for corrosion protection. The kernel of this process is a chemical reaction between the substrate and acid replenisher containing zinc and metal cations, and phosphate and fluoride anions. The rate of the reaction is determined by an accelerating agent—nitrite concentration. The coating quality and corrosion performance are strongly related to the precise control of the phosphate solution constituents within specified narrow ranges. Optimal phosphate coatings are obtained only if the major bath constituents are maintained within narrow regions. A phosphate bath is characterized with dead times of about 20–30 minutes. These time constants are dependent on the bath constituents and vary over time. Overshooting is to be avoided because it takes a long time for the bath to recover from an excess of some component. Furthermore, overshooting produces a considerable amount of sludge.

One prior art phosphate bath control system approach uses programmable logic controllers (PLC) to control constituents. These systems monitor a conductivity probe which provides information about the integral metal cations concentration in the bath. Chemical feed control for metals and total acid are based on total bath concentration rather than on individual parameter measurements. Titrations for total acid, nitrite, and free acid are performed manually. Metal concentrations are not measured in the plant but analyzed every 2-3 weeks and therefore critical information is not available until long after the event. FIG. 1 shows a plot of the Zn concentrations of a phosphate bath under PLC control based on conductivity measurements. The result of this type of control are significant fluctuations of the metal components which are associated with unstable quality of coating and production of considerable amounts of sludge. Control systems that are based on automatic titrations of metals, total acid, free acid and nitrite are also available. However, these systems are of low reliability in a production environment and require sophisticated maintenance.

One straightforward alternative is a (linear) PID control strategy, which is a well established control strategy that does not require special efforts for realization, implementation, and tuning. However, there are several major concerns regarding implementation of a conventional linear PID control algorithm for phosphate bath control. These concerns are:

nonlilnearilty of system dynamics;

significant and variable dead times;

wide operating range—regulation for small and large (start-up phase) deviations from the setpoint;

heuristic information cannot be formalized analytically.

Simulation studies show the lack of robustness of the PID control of the Zn concentration for significant changes in process conditions. Control performance drastically decreases for a large perturbation of the Zn gain of the replenisher. Another difficulty related to the PID control is the problem of including the heuristics in the control algorithm. This task could contribute significantly to the complexity of the control strategy.

SUMMARY OF THE INVENTION

In accordance with the present invention, a phosphate bath control system is provided based on fuzzy logic and which is not only robust but allows the inclusion of heuristic information. The control system tracks the set points of the major process variables of the phosphate bath—Zinc (Zn), Manganese (Mn), and Total Acid (TA) independently of variations in the production conditions.

A computerized chemical detector determines the current values of Zn, Mn, and TA provided by an on-line X-ray fluorescence analyzer. The current values are fed to a controller where the feasibility of the data is analyzed and feasible data are filtered by using the exponential smoothing method. The controller also receives set-point inputs for Zn, Mn, and TA which are stored in the controller memory. The controller periodically updates the flow rates of a replenisher pump, a make-up pump and an additive pump. These pumps respectively control the flow of liquid concentrates to the bath in order to regulate the concentration of Zn, TA, and Mn with respect to the set points. The controller uses a fuzzy logic control algorithm based on three rule bases that define the respective strategies for controlling the Zn, TA, and Mn contents of the bath.

The control system is able to achieve a high rise time in the start-up periods which are characterized with large errors between the set-point and controlled variables. Measurement noise is compensated; unreasonable readings, e.g. too low, too high values, and/or drastic changes in the measured variable over a short period of time are eliminated. In addition, high reliability and robustness of the control system is attained.

If desired, the control system may rely solely on the detected Zn content of the bath as an indicator of the concentration of the other constituents of the bath. A known replenisher concentrate, that contains the various constituents of the bath in the desired proportions of the bath, is employed in this instance and Zinc is used as a proxy for the other constituents.

BRIEF DESCRIPTION OF THE DRAWINGS

A more complete understanding of the present invention may be had from the following detailed description which should be read in conjunction with the drawings in which, FIG. 1 is a plot of Zinc concentration of a phosphate bath under PLC control based on conductivity measurements;

FIG. 2 shows the inputs and output of the phosphate bath from an overall system standpoint;

FIG. 3 is an overall block diagram of the control system of the present invention;

DETAILED DESCRIPTION OF PREFERRED EMBODIMENT

Figure 4:
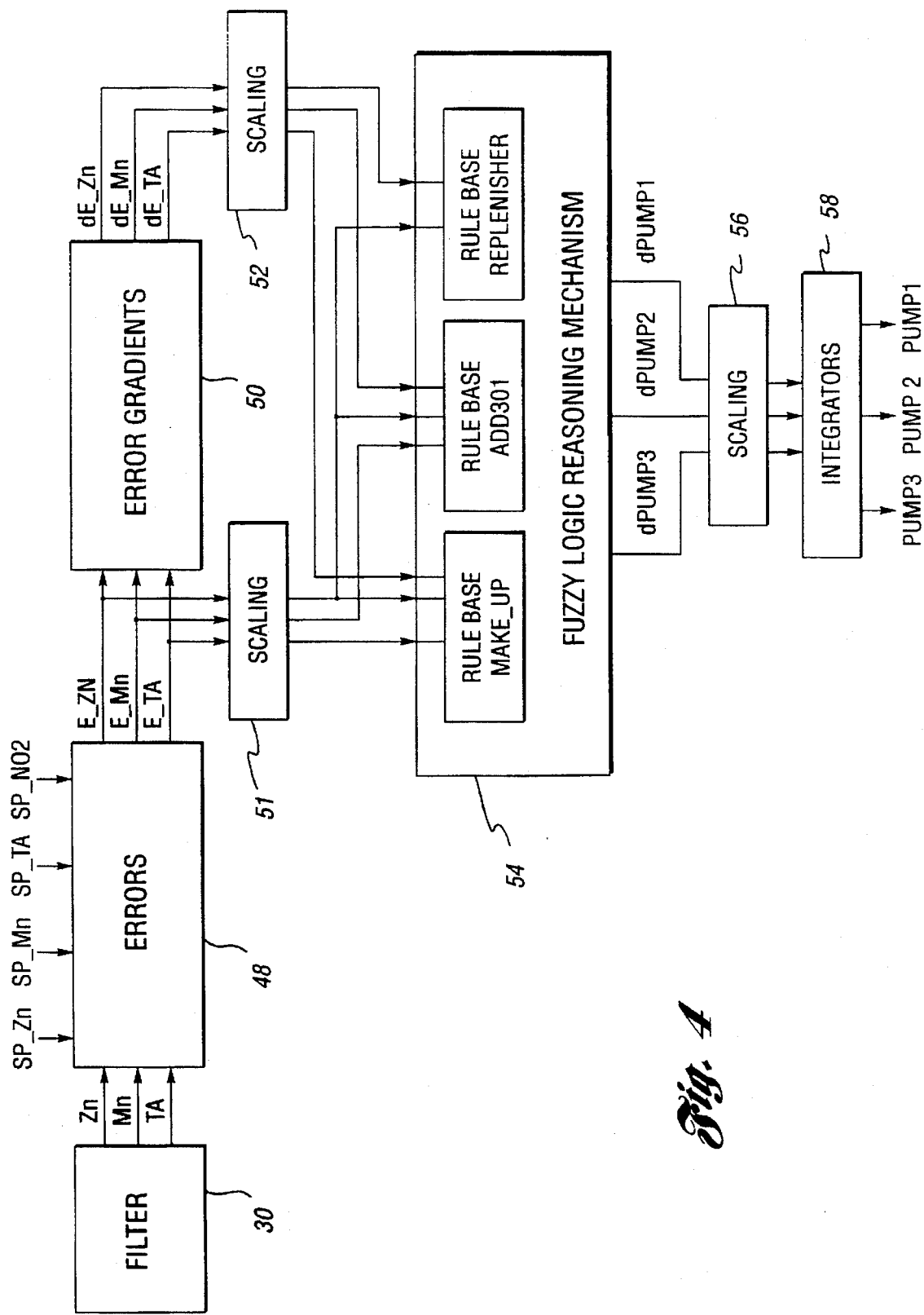
FIG. 4 is a more detailed block diagram of the controller of the present invention.

Referring now to the drawings, and initially to FIG. 2, the phosphate bath, from a system standpoint, is a multi-variable, nonlinear control object as depicted therein. Its nominal dynamics is approximately captured by the following set of nonlinear difference equation that are derived from the material balance of the bath:

$$Zn(k+1)=Zn(k)+G_{Zn/R} R(k-b\ 1)\ T-D_{Zn}\ Zn(k)\ Ncar$$

$$Mn(k+1)=Mn(k)+G_{Mn/R} R(k-1)\ T+G_{Mn/ADD}\ ADD(k-)\ T-D_{Mn}\ Ncar$$

$$TA(k+1)=TA(k)+G_{TA/M}\ M(k-1)\ T+G_{TA/R}\ R(k-1)\ T+G_{TA/ADD}\ ADD(k-1)\ T\ TA(k)\ T$$

$$NO2(k+1)=NO2(k)+G_{NO2/A}\ A(k-1)\ T-D_{NO_2\_idl}\ T-D_{NO2}\ Ncar$$

where $G_{Zn/R}$ Zn gain of the replenisher (gallons of Replenisher to increase Zn by 1 ppm); nominal value: $G_{Zn/R}$=103/108 [ppm/gal]

$D_{Zn}$ Zn depletion rate (unknown)

R Replenisher B958R flow for 1 interval T $G_{Mn/R}$ Mn gain of the replenisher (gallons of Replenisher to increase Mn by 1 ppm; nominal value: $G_{Mn/R}$=31/108 [ppm/gal]

$G_{mn/ADD}$ Mn gain of the additive (gallons of Additive 301 to increase Mn by 1 ppm); nominal value: $G_{mn/ADD}$= 688 /184.2 [ppm/gal]

$D_{Mn}$ Mn depletion rate (unknown)

ADD Additive 301 flow for 1 interval T $G_{TA/M}$ TA gain of the make-up (gallons of Make-up to increase TA by 1 pts); nominal value: $G_{TA/M}$=1/69.6 [pts/gal]

$G_{TA/R}$ TA gain of the replenisher (gallons of Replenisher to increase TA by 1 pts); nominal value: $G_{TA/R}$=1/108 [pts/gal]

$G_{TA/ADD}$ TA gain of the additive rgallons of Additive 301 no increase TA by 1 pts); nominal value: $G_{TA/ADD}$=1/ 184.2 [pts/gal]

$D_{TA}$ TA consumption rate (unknown)

M Make-up B958 flow for 1 interval T $G_{NO2/A}$ NO2 gain of the accelerator (gallons of Accelerator to increase NO2 by 1 pts); nominal value: $G_{NO2/A}$=1/7.5 [pts/gal]

$D_{NO_2\_idl}$ natural depletion rate (idle bath) (unknown)

$D_{NO2}$ depletion rate (unknown)

A Accelerator 131 flow for 1 interval T

Ncar Number of cars for 1 interval T

Model parameters are estimated assuming constant depletion rates, known number of cars passing through the bath, known flow rates of input streams, and stationary concentrations of bath constituents. However, in production conditions these assumptions are not satisfied in general. Parameters $G_{Zn/R}$, $G_{Mn/R}$, $G_{mn/ADD}$, $G_{TA/M}$, $G_{TA/R}$, $G_{TA/ADD}$, $G_{NO2/A}$ are unknown nonlinear functions of the process variables Zn, Mn, and TA. Therefore, the math model above represents only a very rough approximation of the real object. In essence, the phosphate control bath can be characterized as a nonlinear, non-stationary, multi-variable system with inherent interactions between input-output variables, which is under the effect of unmeasurable disturbances.

Referring now to FIG. 3, a block diagram of the phosphate bath control system of the present invention, is shown. A computerized chemical detector including an on-line X-ray fluorescence analyzer, generally designated 10, detects the current values of Zn, Mn, and TA from a sample of obtained from a phosphate bath 12. Additional details regarding a suitable detector may be found in DeCello et al U.S. Pat. No. 5,117,370 assigned to the assignee of the present invention. The current values of the variables are provided to a fuzzy logic controller generally designated 14. The FLC 14 stores set-points for the variables and processes the input data to control the flow rates of three input streams. The FLC 14 updates the flow rates of pump 16 supplying replenisher, pump 18 supplying make-up, and pump 20 supplying additive every discrete time period k by manipulating their on-time/off-time ratios (duty cycles) denoted as Pump1, Pump2, and Pump3.

Figure 5:
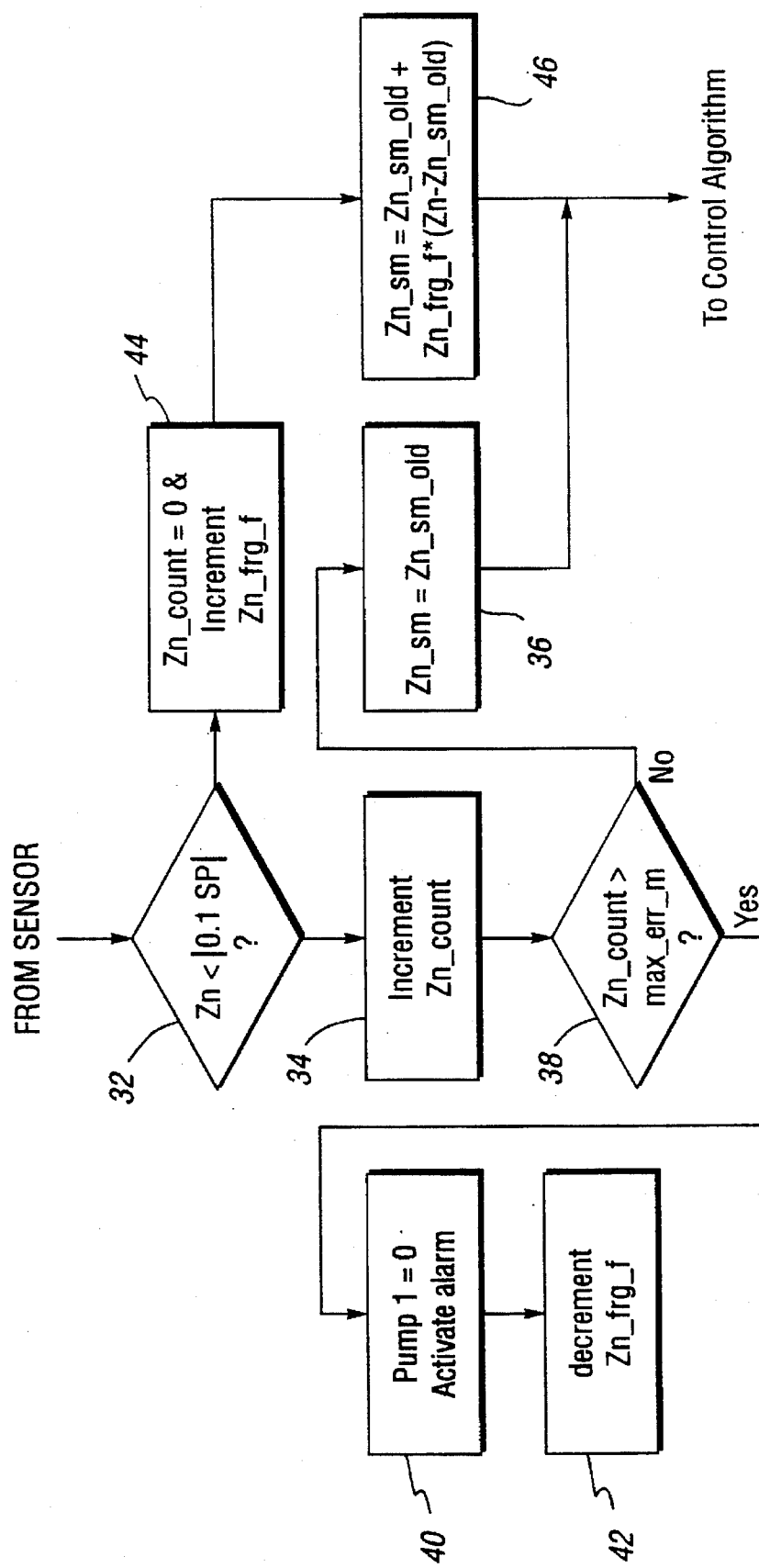
FIG. 5 is a flow diagram of the filtering method employed in the present invention.

Referring now to FIG. 4, a more detailed block diagram of the controller 14 is shown. The input variables Zn, Mn, and TA, are smoothed in a filter block 30, by applying an exponential smoothing algorithm. This algorithm is shown in FIG. 5. Referring to FIG. 5, the filtering subsystem performs the functions of testing the input data for feasibility and for exponentially smoothing the feasible data. Zn readings below 10% of the Zn set-point are considered bad data due to a variety of reasons associated with the detector system for sampling the bath, such as an insufficient bath sample. Zn readings below 10% of the Zn set-point are detected in decision block 32. The number of consecutive bad data readings, Zn_count, is updated periodically by incrementing a counter as indicated at 34. Isolated bad data readings are excluded and replaced by the previous feasible data readings (Zn_sm_old) in block 36. Systematic bad data readings (more than max_err_m consecutive infeasible readings) are detected in decision block 38 and cause deactivation of the particular control loop, and alarm activation as indicated in the block 40. Thereafter the forgetting factor Zn_frg_f of the exponential smoothing algorithm is decremented at 42. In contrast, systematic feasible readings reset the Zn_count and increment the forgetting factor as indicated in block 44. The exponential smoothing of the data is then performed in the block 46. The maximum value of the forgetting factor is 0.98. The same algorithm is employed in connection with the Mn and TA readings.

Returning to FIG. 4, the set point for each variable, namely SP_Zn, SP_Mn, and SP_TA, as well as the current smoothed value of the variable is input to error calculating block 48 where the errors E_Zn, E_Mn, and E_TA, between the process variable and its associated set point is calculated. The gradient of each of these errors, namely dE_Zn, dE_Mn, dE_TA, is calculated in block 50.

The actual values of the errors and their gradients are scaled in the blocks 51 and 52 with scaling factors that map them to the interval [−128, 127]. The reason for this scaling are twofold. The actual operating ranges of the Zn, Mn, and TA (and their set-points) are [0, 1000] ppm, [0, 500] ppm, and [0, 30] ppm respectively, but the hardware platform uses an 8-bit microcontroller. The scaling factors allow the FLC to be tuned by using rules for tuning PI controllers (Essentials of Fuzzy Modeling and Control, Yager and Filev, 1994, published by John Wiley & Sons, Inc., p. 141).

Figure 6:
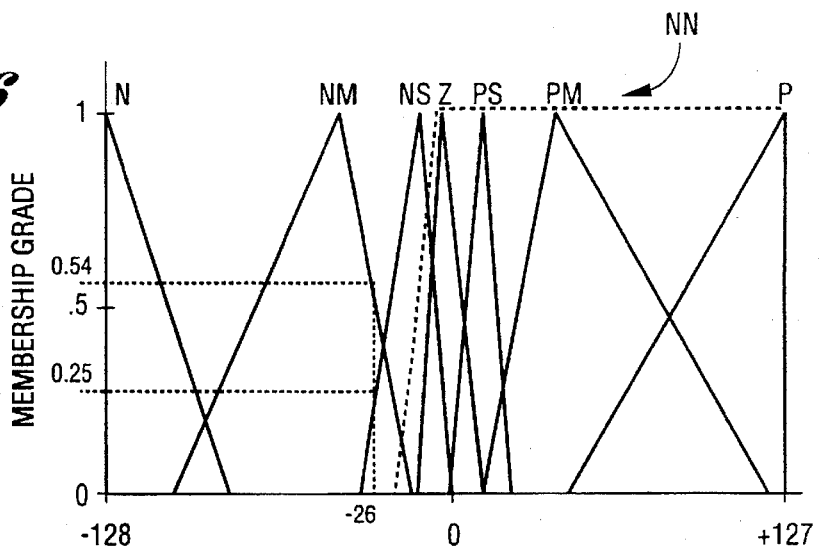
FIGS. 6–11 show the membership functions of linguistic labels that are assigned to each of the scaled input variables E_Zn, dE_Zn, E_Mn, dE_Mn, E_TA, and dE_TA respectively.
Figure 7:
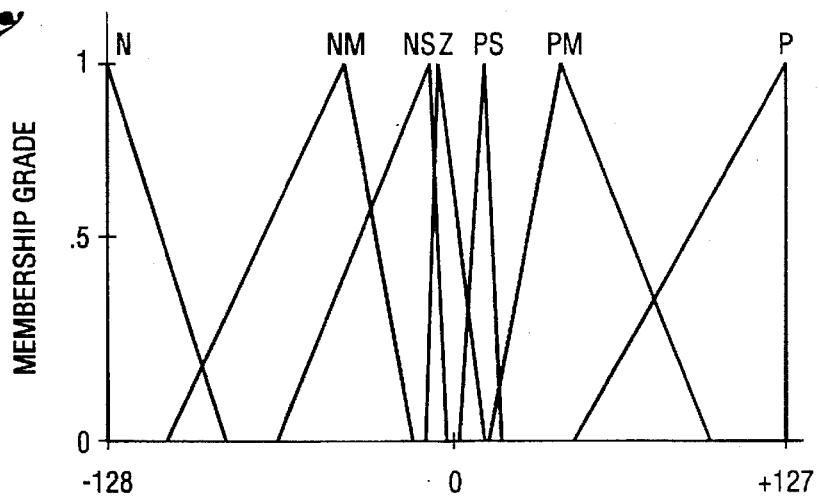
Figure 8:
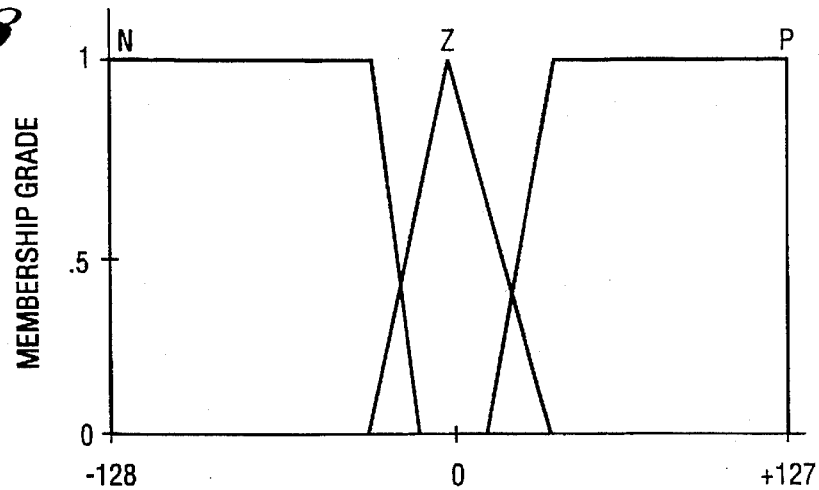
Figure 9:
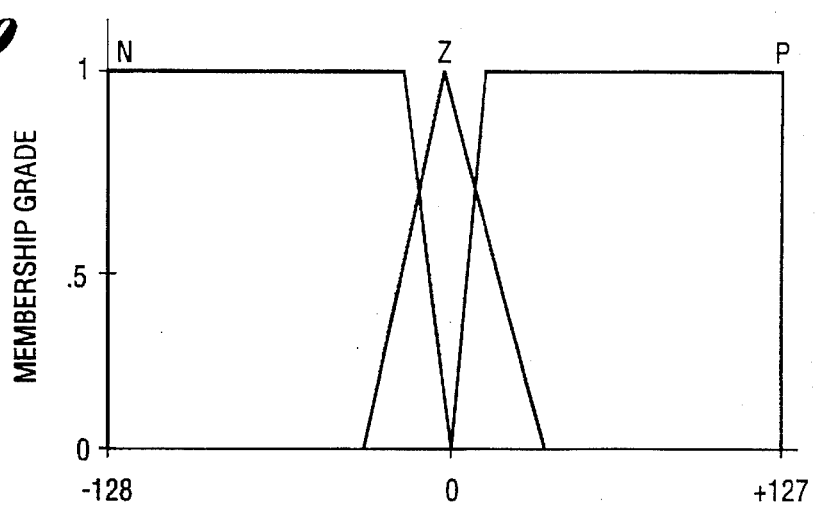
Figure 10:
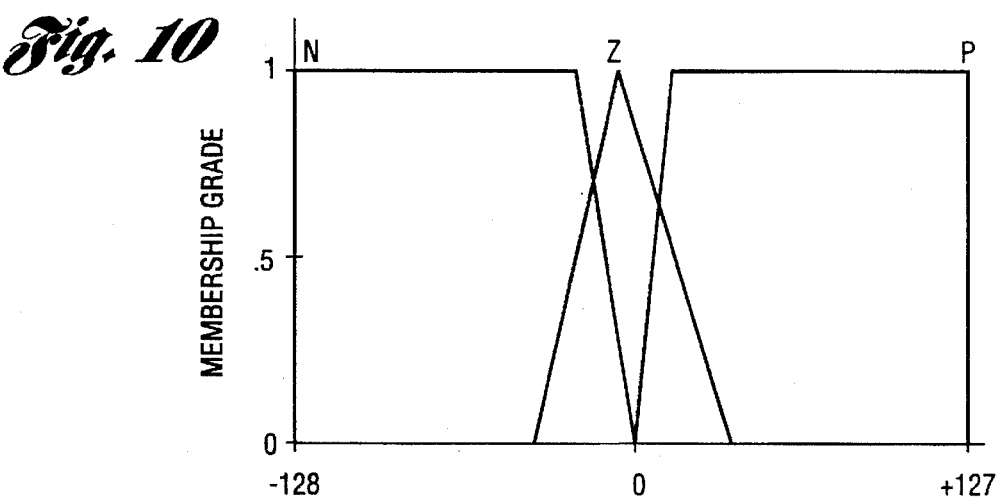
Figure 11:
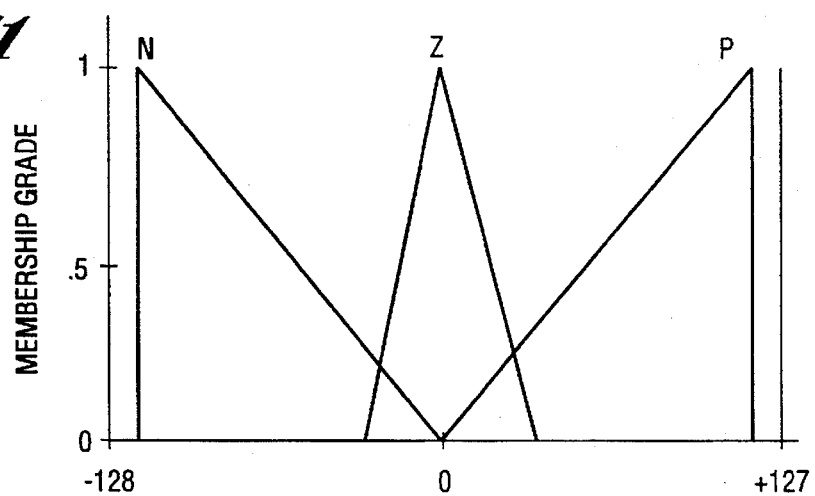
Figure 12:
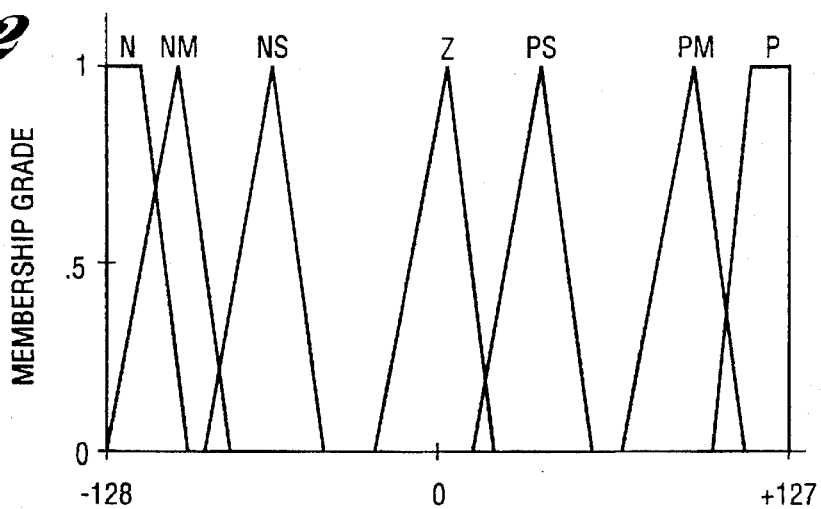
FIGS. 12–14 show the membership functions of the linguistic labels that are assigned to each of the gradients dPump1, dPump2, and dPump3, of the output variables.
Figure 13:
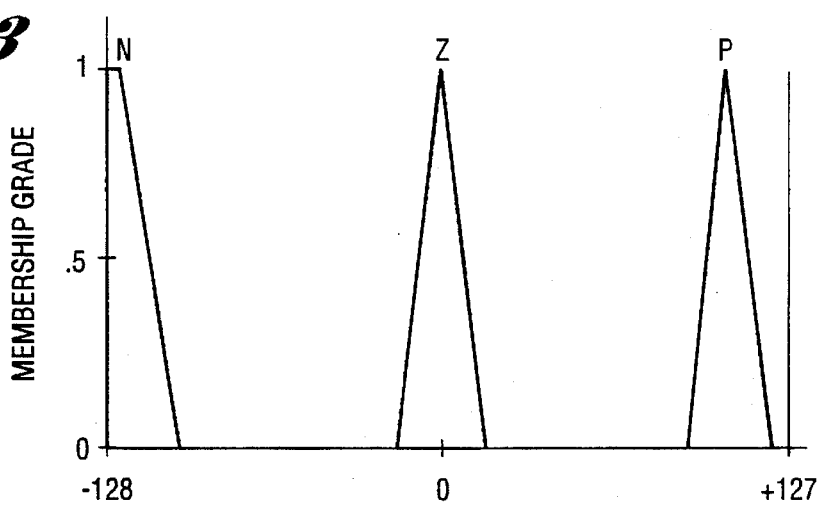
Figure 14:
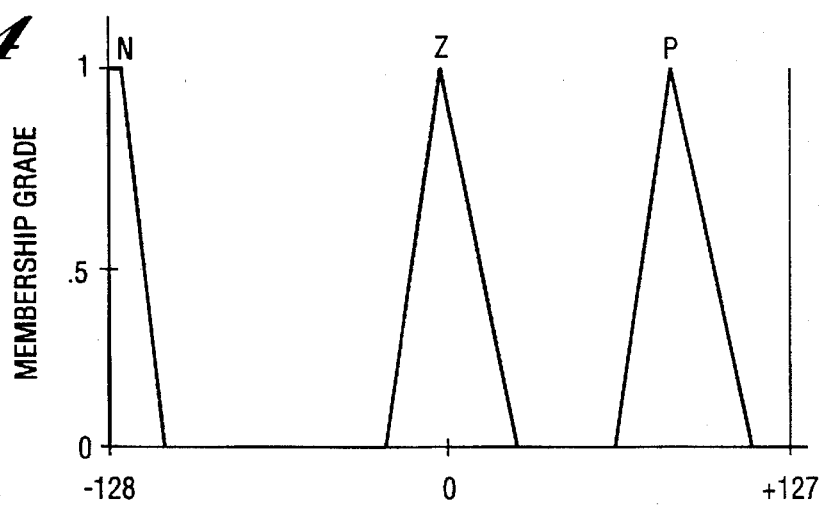

Scaled values of the errors and their gradients are then fuzzified in the fuzzy logic block 54. The process of fuzzification is essentially one of assigning linguistic labels −N (negative), NM (negative medium), NS (negative small), Z (zero), PS (positive small), PM (positive medium), P (positive) to the input and output variables. Each linguistic label is a fuzzy set represented by a membership function. The membership functions associated with the labels that are assigned to each of the scaled input variables E_Zn, dE_Zn, E_Mn, dE_Mn, E_TA, and dE_TA are presented in FIGS. 6–11. Membership functions determine the degree of membership of every scaled reading with respect to the linguistic labels assigned to the particular variable. For instance, for the scaled value −26 of E_Zn, FIG. 6 yields membership degrees of 0.25 and 0.54 respectively, with respect to the labels NS (negative small) and NM (negative medium). The membership degrees of this scaled value with respect to the other linguistic labels associated with this variable are zero. An important consideration that should be taken into account in the process of fuzzification of the input variables is to provide overlapping membership functions of the linguistic labels. The fuzzified input variables form the antecedents (predicates) of the IF . . . THEN rules that are included in the kernel of the FLC i.e. its 3 rule-bases. The consequents of the IF . . . THEN rules are the fuzzified gradients dPump1, dPump2, and dPump3 of the output variables (duty cycles of the pumps supplying Replenisher, Additive and Make-up). Fuzzified gradients are linguistic labels N (negative), NM (negative medium), NS (negative small), Z (zero), PS (positive small), PM (positive medium), P (positive) associated with the scaled values of the gradients. Membership functions of the fuzzified gradients are presented in FIGS. 12–14 Membership functions of all fuzzified variables are stored in memory so for every scaled reading of the particular variable the respective degrees of membership may be read from memory. The fuzzification results in a partitioning of the range of a particular variable into fuzzy regions and in a granularization of the input-output space of the FLC.

The rule-bases represent the algorithms for manipulating the input streams—Replenisher, Make-up, and Additive (Tables I–III). These algorithms are described in a linguistic format by using IF . . . THEN rules that relate the fuzzified input variables (linguistic labels) of E_Zn, E_Mn, E_TA, dE_Zn, dE_Mn, and dE_TA to the fuzzified gradients dPump1, dPump2, and dPump3 of the output variables. For a given set of crisp (deterministic) input values the outputs of the rule-bases are calculated by application of the Simplified Reasoning Method (Min-max-gravity method versus product-sum-gravity method for fuzzy controls by Mizumoto, 1991, published in Proceedings of the 4th IFSA Congress, Brussels, pp.127–130). The advantage of this method compared to the Mamdani method of reasoning commonly used in most fuzzy logic controllers is that it eliminates the tedious step of defuzzification. In the Simplified Reasoning Method the defuzzification is performed only once on the consequent fuzzy sets. Then the reasoning mechanism works with the defuzzified values (centroids) of the consequent fuzzy sets.

The Replenisher rule-base (Table I) defines the algorithm for controlling the Zn by controlling the flow of a known replenisher concentrate, for example, B958R from Parker & Amchem (Madison Heights, Mich.). It has two inputs—the error between the current Zn(k) reading and the set-point E_Zn(k)=Zn(k)− SP_Zn, the gradient of the error dE_Zn (k)=E_Zn(k)−E_Zn(k−1). The output of this rule base is the gradient dPump1 of the Replenisher pump duty cycle.

The rule-base contains 15 rules. These rules realize nonlinear PI-like control strategy (Essentials of Fuzzy Modeling and Control, Yager and Filer, 1994, published by John Wiley & Sons, Inc., p. 268), with rules 1–4, 7–11, 13, and 14 providing a fast response in the start-up periods and stable control around the set-point. Rules 5, 6, and 12 reflect the specific application of the phosphate bath where even a slight overshooting or a tendency for overshooting requires a strong control action of drastically decreasing the duty cycle gradient dPump1.

For given scaled crisp values of E_Zn* and dE_Zn*, the crisp value of the scaled gradient dPump1 is calculated by applying the Simplified Reasoning Method:

$$dPump1 = \mathrm{sum}[\min(E\_Zn\_lbl(i)\_mbr\_grd(E\_Zn^*), dE\_Zn\_lbl(i)\_mbr\_grd(dE\_Zn^*))^*dPump1\_lbl(i)\_cntrd]/\mathrm{sum}[\min(E\_Zn\_lbl(i)\_mbr\_grd(E\_Zn^*)^*dE\_Zn\_lbl(i)\_mbr\_grd(dE\_Zn^*))]$$

where

E_Zn_lbl(i)_mbr_grd(E_Zn*) is the membership grade of the scaled reading E_Zn* with respect to the E_Zn label in the i-th rule, dE_Zn_lbl(i)_mbr_grd(dE_Zn*) is the membership grade of the scaled reading dE_Zn* with respect to the dE_Zn label in the i-th rule, dPump1_lbl(i)_cntrd is the center of gravity (centroid) of the dPump1 label in the i-th rule, and the sum is taken over all rules in the Replenisher rule-base.

TABLE I

| REPLENISHER RULEBASE | |
| --- | --- |
| Rule 1 | IF (E_Zn is Z) AND (dE_Zn IS N) THEN dPUMP1=P |
| Rule 2 | IF (E_Zn is Z) AND (dE_Zn IS NM) THEN dPUMP1=PM |
| Rule 3 | IF (E_Zn is Z) AND (dE_Zn IS NS) THEN dPUMP1=PS |
| Rule 4 | IF (E_Zn is Z) AND (dE_Zn IS Z) THEN dPUMP1=Z |
| Rule 5 | IF (E_Zn is Z) AND (dE_Zn IS PS) THEN dPUMP1=N |
| Rule 6 | IF (E_Zn is Z) AND (dE_Zn IS PM) THEN dPUMP1=N |
| Rule 7 | IF (E_Zn is Z) AND (dE_Zn IS P) THEN dPUMP1=N |
| Rule 8 | IF (E_Zn is N) AND (dE_Zn IS Z) THEN dPUMP1=P |
| Rule 9 | IF (E_Zn is NM) AND (dE_Zn IS Z) THEN dPUMP1=PM |
| Rule 10 | IF (E_Zn is NS) AND (dE_Zn IS Z) THEN dPUMP1=PS |
| Rule 11 | IF (E_Zn is PS) AND (dE_Zn IS Z) THEN dPUMP1=NM |
| Rule 12 | IF (E_Zn is PM) AND (dE_Zn IS Z) THEN dPUMP1=N |
| Rule 13 | IF (E_Zn is P) AND (dE_Zn IS Z) THEN dPUMP1=N |
| Rule 14 | IF (E_Zn is NS) AND (dE_Zn IS PS) THEN dPUMP1=P |
| Rule 15 | IF (E_Zn is PS) AND (dE_Zn IS NS) THEN dPUMP1=NS |

The Make-up rule-base (Table II) defines the algorithm for controlling of the Total Acid by manipulating the Make-Up B958MU, available from Parker & Amchem. It has three inputs—the error between the current TA(k) reading and the set-point E_TA(k)=TA(k)−SP_TA, the gradient of the error dE_TA(k)=E_TA(k)−E_TA(k−1), and the error, between the current Zn(k) reading and the set-point, E_Zn (k)=Zn (k)−SP_Zn. The output of this rule-base is the gradient dPump2 of the Make_Up pump duty cycle. This rule-base realizes a nonlinear PI-like control which is conditioned by the non-negative error E_Zn(k) between the current Zn(k) reading and the set-point—labeled as NN (nonnegative), in FIG. 6. It reflects the specific requirement to use make-up only in the cases when the Zn set-point has been reached but desired TA has not been achieved by adding replenisher; in these situations concentrated acidic solution is added to the bath.

TABLE II

MAKE-UP RULEBASE

| Rule 201 | IF (E_TA is N) AND (dE_TA IS N) AND (E_Zn IS NN) THEN dPUMP2=P |
|---|---|
| Rule 202 | IF (E_TA is N) AND (dE_TA IS Z) AND (E_Zn IS NN) THEN dPUMP2=P |
| Rule 203 | IF (E_TA is Z) AND (dE_TA IS N) AND (E_Zn IS NN) THEN dPUMP2=P |
| Rule 204 | IF (E_TA is Z) AND (dE_TA IS Z) AND (E_Zn IS NN) THEN dPUMP2=Z |
| Rule 205 | IF (E_TA is Z) AND (dE_TA IS P) AND (E_Zn IS NN) THEN dPUMP2=N |
| Rule 206 | IF (E_TA is P) AND (dE_TA IS Z) AND (E_Zn IS NN) THEN dPUMP2=N |
| Rule 207 | IF (E_TA is P) AND (dE_TA IS P) AND (E_Zn IS NN) THEN dPUMP2=N |

For given scaled crisp values of the E_TA*, dE_TA* and E_Zn*, the crisp value of the scaled gradient dPump2 is calculated by applying the Simplified Reasoning Method:

$$dPump2=sum[min(E\_TA\_lbl(i)\_mbr\_grd(E\_TA^*), dE\_TA\_lbl(i)\_mbr\_grd(dE\_TA^*), E\_Zn\_lbl(i)\_mbr\_grd(E\_Zn^*))^*dPump2\_lbl(i)\_cntrd]/sum[min(E\_TA\_lbl(i)\_mbr\_grd(E\_TA^*), dE\_TA\_lbl(i)\_mbr\_grd(dE\_TA^*), E\_Zn\_lbl(i)\_mbr\_grd(E\_Zn^*))]$$

where

E_TA_lbl(i)_mbr_grd(E_TA*) is the membership grade of the scaled reading E_TA* with respect to the E_TA label in the i-th rule, dE_TA_lbl(i)_mbr_grd(dE_TA*) is the membership grade of the scaled reading dE_TA* with respect to the dE_TA label in the i-th rule, E_Zn_lbl(i)_mbr_grd(E_Zn*) is the membership grade of the scaled reading E_Zn* with respect to the E_Zn label in the i-th rule, dpump2_lbl(i)_cntrd is the center of gravity (centroid) of the dPump2 label in the i-th rule, and the sum is taken over all rules in the Make-up rule-base.

The Additive rule-base (Table III) defines the algorithm for controlling the Manganese by manipulating the additive ADD301, from Parker & Amchem. It has three inputs—the error, between the current Mn(k) reading and the set-point, E_Mn(k)=Mn(k)−SP_Mn; the gradient of the error dE_Mn(k)=E_Mn(k)−E_Mn(k−1); and the error E_Zn(k) between the current Zn(k) reading and its set-point. The output is the gradient dPump3 of the ADD301 pump duty cycle. This rule-base realizes a nonlinear PI-like control which is conditioned by the nonnegative error E_Zn(k) between the current Zn(k) reading and the set-point—labeled as NN (nonnegative) in FIG. 6. It provides for addition of Additive only in the cases when the Zn set-point has been reached but desired Mn concentration is below the Mn set-point. In this event a concentrated Mn solution is added to the bath.

For given scaled crisp values of the E_Mn*, dE_Mn* and E_Zn*, the crisp value of the scaled gradient dPump3 is calculated by applying the Simplified Reasoning Method:

$$dPump3=sum[min(E\_Mn\_lbl(i)\_mbr\_grd(E\_Mn^*), dE\_Mn\_lbl(i)\_mbr\_grd(dE\_Mn^*), E\_Zn\_lbl(i)\_mbr\_grd(E\_Zn^*))^*dPump3\_lbl(i)\_cntrd]/sum[min(E\_Mn\_lbl(i)\_mbr\_grd(E\_Mn^*), dE\_Mn\_lbl(i)\_mbr\_grd(dE\_Mn^*), E\_Zn\_lbl(i)\_mbr\_grd(E\_Zn^*))]$$

where

E_Mn_lbl(i)_mbr_grd(E_Mn*) is the membership grade of the scaled reading E_Mn* with respect to the E_Mn label in the i-th rule, dE_Mn_lbl(i)_mbr_grd(dE_Mn*) is the membership grade of the scaled reading dE_Mn* with respect to the dE_Mn label in the i-th rule, E_Zn_lbl(i)_mbr_grd(E_Zn*) is the membership grade of the scaled reading E_Zn* with respect to the E_Zn label in the i-th rule, dPump3_lbl(i)_cntrd is the center of gravity (centroid) of the dPump3 label in the i-th rule, and the sum is taken over all rules in the Additive rule-base.

TABLE III

ADDITIVE RULEBASE

| Rule 301 | IF (E_Mn is N) AND (dE_Mn IS N) AND (E_Zn IS NN) THEN dPUMP3=P |
|---|---|
| Rule 302 | IF (E_TA is N) AND (dE_Mn IS Z) AND (E_Zn IS NN) THEN dPUMP3=P |
| Rule 303 | IF (E_Mn is Z) AND (dE_Mn IS N) AND (E_Zn IS NN) THEN dPUMP3=P |
| Rule 304 | IF (E_Mn is Z) AND (dE_Mn IS Z) AND (E_Zn IS NN) THEN dPUMP3=Z |
| Rule 305 | IF (E_Mn is Z) AND (dE_Mn IS P) AND (E_Zn IS NN) THEN dPUMP3=N |
| Rule 306 | IF (E_Mn is P) AND (dE_Mn IS Z) AND (E_Zn IS NN) THEN dPUMP3=N |
| Rule 307 | IF (E_Mn is P) AND (dE_Mn IS P) AND (E_Zn IS NN) THEN dPUMP3=N |

As seen from the expressions for the crisp values of the gradients dPump1, dPump2, dPump3 according to the Simplified Reasoning Method, these values are obtained effectively through interpolation over the centroids of the fuzzy sets associated with the labels assigned to these variables. The operating range of these variables is [−128, 127]. To convert them to the operating range of the output variables Pump1, Pump2, Pump3 they are scaled to the range [−1, 1] in scaling block 56.

Output variables Pump1, Pump2, and Pump3 are calculated by integrating the scaled gradients dPump1, dPump2, and dPump3 in the integrator block 58.

$$Pump(i)=max(min((Pump(i)+dPump(i)), 1), 0)$$

where i takes values 1, 2, 3. The lower and the upper limits of the integration are 0 and 1. This integration law places the output values calculated by the control algorithm within the unit interval that is the range of the output parameters ie. the pump duty cycles Pump1, Pump2, and Pump3.

Figure 15:
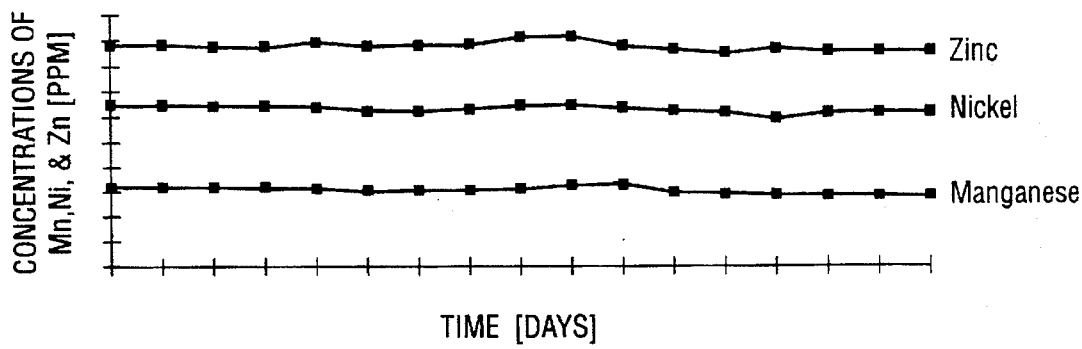
FIG. 15 is a plot of concentration of Zinc, Manganese and Total Acid over time when the present invention is practiced using only Zinc concentration measurements to control the bath.

The control system described above was applied for controlling the composition of a 70000 gal production phosphating tank containing the metal constituents in an acidic bath formulation. The depletion of the metal constituents results from the formation of mix metal phosphate coatings comprising zinc phosphate, zinc nickel phosphate, and zinc manganese phosphate with zinc being the predominant constituent of these compositions. By replenishing the bath through addition of a replenisher (Replenisher B958) containing a fixed ratio of the metal constituents it was noted that satisfactory results can be obtained by controlling only the Zn concentration. As shown in FIG. 15, Nickel and Manganese concentrations tracked the Zinc concentration over time. However, separate addition of highly concentrated manganese (Additive 301) and a metal free acid solution (Make-up B958) may be required in cases where the manganese concentration and total acid level as determined by the replenisher composition are not satisfactory. In these cases specific control of total acid and manganese is advantageous. A Replenisher such as B958R is preferable for controlling the Zn, Mn and Total Acid content because it has an effect on each of these controlled variables; Make-up B958MU has major effect on the Total Acid and Nickel concentration; Additive ADD301 effects both the Mn and the Total Acid. Further details regarding the replenisher B958R are disclosed in U.S. Pat. Nos. 4,838,957 and 4,961,794. It will be understood that while Zn is detected for controlling addition of Replenisher B958R, Ni content could be used instead of Zn without departing from the invention.

As indicated previously, the rate of the reaction is determined by an accelerating agent such as nitrite. The equation describing this input is defined in connection with FIG. 2. Another feature of the present invention is a reliable on-line method for measuring nitrite concentration and utilizing the controller for controlling the introduction of an accelerator concentrate such as sodium nitrite. The method is based on a model and the model parameters are updated based on a learning algorithm. The method replaces the prior art manual control actions of the operator who manipulate accelerator flow-rate based on his judgment, by a control algorithm that uses measurements taken by the operator as reference points to predict the changes in the nitrite concentration based on a material-balance model and to calculate the respective control actions.

Figure 16:
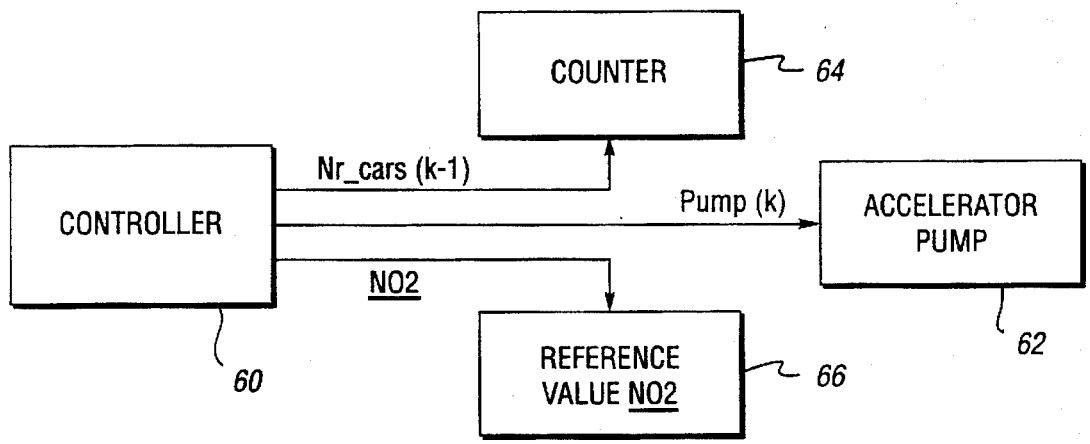
FIG. 16 is a block-diagram of a system for indirect estimation and control of accelerator.

A block-diagram of the system for indirect estimation and control of accelerator is shown in FIG. 16. The controller 60 updates the on-time ratio of Pump(k) of the accelerator pump 62 at discrete periods of time k, k+1, ..., with a constant interval T based on an algorithm for indirect estimation and control. A counter 64 counts the number of cars Nr_cars(k−1) entering the bath in the previous interval T. Reference reading NO+b 2, indicated at 66, is stored in the controller 60. Only one reference reading is required for starting the algorithm. However, more reference readings improve the precision and quality of control. The algorithm for indirect estimation and control is the kernel of this system. It is based on a math model which represents the material balance of the nitrite in the bath.

Math Model of Nitrite Material Balance $$NO2(k+1) = NO2(k) + Pump(k) * Pump\_gain*T - (Nr\_cars(k-1)*NO2\_dpl\_cnst + NO2\_dpl\_idl*T) \quad (1)$$

where

T—time interval between two consecutive periods k and k+1

Nr_cars(k)—number of cars process in the interval T

Pump (k)—Pump on/off-time ratio (duty cycle) of the pump supplying accelerator to the bath in the period k; the maximal value of Pump(k) is 1 which reflects the case of a pump operating during the whole interval T; the minimal value of Pump(k) is 0 which reflects the case of a completely closed accelerator pump during the interval T Pump_gain—change of the NO2 if Pump opens for time T NO2_dpl_cnst—change of the NO2 if one car is processed NO2_dpl_idl—natural depletion rate of NO2 if the bath is idle Model parameters Pump_gain, NO2_dpl_cnst, and NO2_dpl_idl are not known but they can be estimated by performing simple experiments off-line:

$$NO2\_dpl\_idl=[NO2(k+1)-NO2(k)]/T \quad (2)$$

with the assumption of 0 cars and no accelerator added (can be estimated when the line is idle).

$$NO2\_dpl\_cnst=NO2\_dpl\_cnst+[NO2(k+1)-NO2(k)]/Nr\_cars \quad (3)$$

with the assumption of no addition of accelerator.

$$Pump\_gain = [NO2(k+1) - NO2(k) + (Nr\_cars(k-1)*NO2\_dpl\_cnst + NO2\_dpl\_idl*T)]/Pump(k)*T \quad (4)$$

Estimation Algorithm and Control Strategy

Figure 17:
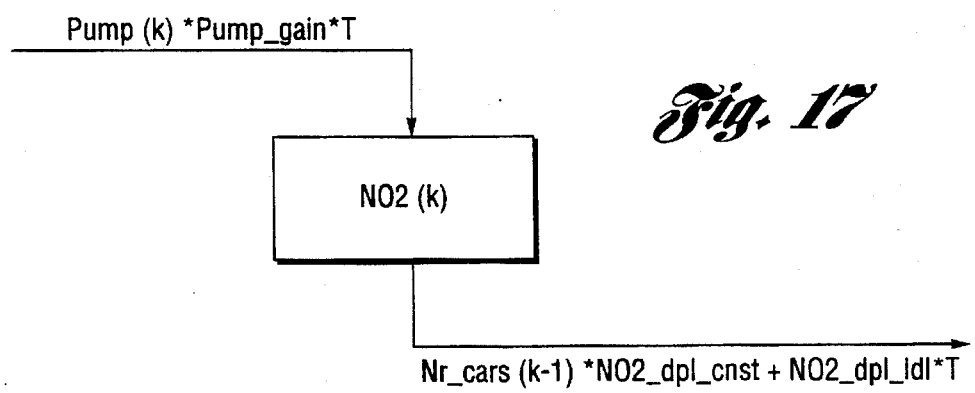
FIG. 17 is a block-diagram illustrating the math model of the estimation algorithm.

A block-diagram illustrating the math model is show in FIG. 17. It follows from the math model that if the reference reading of the nitrite taken in the period s is NO+b 2, and the set-point is NO2*, then the pump on-time ratio in the next periods s+1, s+2, ... until the NO2 concentration equals the set point NO2* is determined as follows:

$$Pump(s) = \min(\max(1,[NO2* - NO2(s) + NR\_cars(s-1)*NO2\_dpl\_cnst + NO2\_dpl\_idl*T]/[Pump\_gain*T]),1) \quad (5)$$

$$NO2(s+1) = NO2(s) + Pump(s) *Pump\_gain*T - (Nr\_cars(s-1)*NO2\_dpl\_cnst + NO2\_dpl\_idl*T) \quad (6)$$

with the initial condition:

$$NO2(s)=\underline{NO+b\,2} \quad (7)$$

The above equation (5) determines the control action, based on the difference between the NO2 estimate and the set-point NO+b 2. Equation (6) works as a predictor of the next step nitrite concentration using the reference value NO2 as an initial condition. Using the recursion (5) and (6) next periods controls and estimates Pump(s+1), NO2(s+1); Pump (s+2), NO2(s+2) are calculated.

From equation (5) it is seen that:

a. for an estimated nitrite value close to the set-point NO2* the control action is:

$$Pump(s)=[Nr\_cars(s-1)*NO2\_dpl\_cnst+NO2\_dpl\_idl*T]/[Pump\_gain*T]$$

This is exactly the steady-state control that follows from the math model (1) considering constant NO2 concentration;

b. for an estimated nitrite value which is too low from the set-point NO+b 2 the control action is:

$$Pump(s)=1$$

i.e. the pump opens completely; this control action reflects the case of start-up when the nitrite concentration is very low;

c. for an estimated nitrite value which is too high from the set-point NO2 the control action is:

$$Pump(s)=0$$

i.e. the pump closes completely; this control action reflects the case of an excess of accelerator in the bath.

Equations (5) and (6) representing the control algorithm and nitrite concentration estimator contain model parameters Pump_gain, NO2_dpl_cnst, and NO2_dpl_idl. These parameters are estimated off-line based on equations (2)-(4). For the same type of plant and production they are supposed constant.

The system for indirect estimation and control of accelerator works in two main modes, an operation mode and a service mode. In the operation mode the system estimates NO2 concentration and calculate control actions based on recursive equations (5) and (6). If a new reference reading is available it automatically is used as a base for estimation. Otherwise the system works with the oldest reference reading. In the service mode the system learns model parameters Pump_gain, NO2_dpl_cnst, and NO2_dpl_idl from data by using equation (2)-(4). This mode is an off-line mode and it is performed only in case of a major change of the process conditions.

While the best mode for carrying out the present invention has been described in detail, those familiar with the art to which this invention relates will recognize various alternative designs and embodiments for practicing the invention as defined by the following claims.

What is claimed is:

1. A method of controlling the content of at least one constituent of a phosphate bath comprising a plurality of constituents, by controlling the energization of a pump that replenishes the bath with a concentrate that contains said at least one constituent, comprising a sequence of the following steps:

sensing the amount of said at least one constituent in the bath, filtering data collected during said sensing step to test the data for feasibility and for smoothing the feasible data collected, calculating the constituent error between the filtered amount sensed and a set-point, calculating the gradient of said constituent error, determining a gradient of output flow rate of concentrate based on the output inferred by a rule-base under a fuzzy reasoning mechanism that responds to said constituent error and the gradient of said constituent error, calculating the flow rate of the concentrate by integrating said determined gradient, and controlling the energization of the pump in accordance with the flow rate in order to regulate the constituent content in the bath at the set-point.

2. The method of claim 1 wherein previously collected feasible data is substituted for collected data that is below a predetermined percentage of the constituent set-point, a forgetting factor in an exponential smoothing algorithm is increased each time the presently collected data is above said predetermined percentage, and said pump is deactivated upon detection of a predetermined number of consecutive data points below said predetermined percentage.

3. The method of claim 2 wherein said at least one constituent is zinc.

4. The method of claim 2 wherein said at least one constituent is manganese.

5. The method of claim 2 wherein said at least one constituent is total acid.

6. The method of claim 1 further comprising the steps of scaling the constituent error, the gradient of said constituent error, and the gradient of the output flow rate.

7. The method of claim 6 wherein the flow rate of the concentrate is calculated based on a limited nonlinear numerical integration of said gradient of the output flow rate.

8. A method of controlling the content of a first and a second constituent in a phosphate bath by controlling the duty cycle of a first pump that replenishes said bath with a first concentrate containing said first constituent in accordance with a first rule base, and controlling the duty cycle of a second pump that replenishes said bath with a second concentrate containing said second constituent in accordance with a second rule base, comprising a sequence of the following steps:

continuously sensing the amount of said first and said second constituent in said bath, calculating a first error between the amount of said first constituent sensed and a first constituent set-point, calculating a second error between the amount of said second constituent sensed and a second constituent set-point, calculating the gradient of said first error and the gradient of said second error, determining a first gradient of output flow rate of said first concentrate based on the output of said first rule base under a fuzzy reasoning mechanism that responds to said first error and the gradient of said first error, determining a second gradient of output flow rate of said second concentrate based on the output of said second rule base under a fuzzy reasoning mechanism that responds to said second error, the gradient of said second error, and non-negative values of said first error, calculating the flow rate of said first and second concentrates by integrating said gradient of output flow rate of said first and second concentrates respectively, and controlling the energization of said first and second pumps in accordance with the flow rate of said first and second concentrates respectively in order to regulate the content of said first and second constituent at said first and second constituent set-points respectively.

9. The method defined in claim 8 wherein said first constituent is zinc.

10. The method defined in claim 9 wherein said second constituent is manganese.

11. The method defined in claim 9 wherein said second constituent is total acid.

12. A method for indirectly estimating and controlling the accelerator content of a phosphate bath containing a plurality of constituents for coating vehicles in a production line, comprising a sequence of the following steps;

counting the number of vehicles entering the bath over a predetermined time interval, estimating the present accelerator content of the bath based on a math model of the accelerator material balance of the bath which takes into account the number of vehicles processed over said time interval, and a past measurement of the accelerator content, and controlling a pump for adding accelerator concentrate to the bath based on the error between the estimated accelerator content and an accelerator set-point.

13. The method of claim 12 wherein parameters of said mathematical model including a pump gain parameter, a nitrite depletion constant, and a natural nitrite depletion rate, are estimated.

14. A method for indirectly estimating and controlling the accelerator content of a phosphate bath containing a plurality of constituents for coating vehicles in a production line, comprising a sequence of the following steps:

counting the number of vehicles, estimating the accelerator content of the bath based on recursive material balance equations with on-line estimated parameters and controlling a pump for adding accelerator concentrate to the bath in accordance with the following equation;

$$NO2(k+1) = NO2(k) + Pump(k)*Pump\_gain*T - (Nr\_cars(k-1)*NO2\_dpl\_cnst + NO2\_dpl\_idl*T)$$

where

T—time interval between two consecutive periods k and k+1

Nr_cars(k)—number of cars processed in the interval T

Pump(k)—Pump on-time ratio of the pump supplying accelerator to the bath in the period k; the maximal value of Pump(k) is 1 which reflects the case of a pump operating during the whole interval T; the minimal value of Pump(k) is 0 which reflects the case of a completely closed accelerator pump during the interval T Pump_gain—change of the NO2 if Pump opens for time T NO2_dpl_cnst—change of the accelerator constituent if one car is processed NO2_dpl_idl—natural depletion rate of the accelerator constituent if the bath is idle.

15. A system for controlling the content of at least one constituent of a phosphate bath comprising a plurality of constituents, by controlling the energization of a pump that replenishes the bath with a concentrate that contains the constituent, comprising:

a detector for continuously sensing the amount of said at least one constituent in the bath, a controller for filtering data detected by said detector and testing the data for feasibility and processing feasible data in accordance with an exponential smoothing algorithm, said controller rejecting non-feasible data based on a predetermined criteria and counting the number of consecutive occurrences of said non-feasible data, said controller increasing a forgetting factor in said exponential smoothing algorithm each time feasible data is detected and deactivating said pump and decrementing said forgetting factor upon detection of a predetermined number of consecutive non-feasible data, said controller calculating;

the constituent error between the amount sensed and a set-point, the gradient of the constituent error, a gradient of output flow rate of concentrate based on the output of a rule base under a fuzzy reasoning mechanism, the output flow rate of the concentrate by integrating the gradient of output flow rate, said controller controlling the duty cycle of the pump in accordance with the output flow rate in order to maintain the constituent content in the bath at the set-point.

16. The system of claim 15 wherein said at least one constituent is zinc.

17. The system of claim 15 wherein said at least one constituent is manganese.

18. A system for controlling the content of zinc and manganese and total acid in a phosphate bath by controlling the duty cycle of a first pump that replenishes said bath with a first concentrate containing zinc in accordance with a first rule base, and controlling the duty cycle of a second pump that replenishes said bath with a second concentrate containing manganese in accordance with a second rule base, and controlling the duty cycle of a third pump that replenishes said bath with a third concentrate of acidic solution in accordance with a third rule base, said system comprising:

a detector for continuously sensing the amount of zinc, manganese, and total acid in said bath, a controller for calculating, the zinc error between said amount of zinc sensed and a zinc set-point, the manganese error between said amount of manganese sensed and a manganese set-point, the total acid error between said amount of total acid sensed and a total acid set-point, the rate of change of said zinc error, said manganese error, and said total acid error, a first gradient of output flow rate of said first concentrate based on the output of said first rule base under a fuzzy reasoning mechanism that responds to said zinc error and the gradient of said zinc error, a second gradient of output flow rate of said second concentrate based on the output of said second rule base under a fuzzy reasoning mechanism that responds to said manganese error, the gradient of said manganese error, and non-negative values of said zinc error, a third gradient of output flow rate of said third concentrate based on the output of said third rule base under a fuzzy reasoning mechanism that responds to said total acid error, the gradient of said total acid error, and non-negative values of said zinc error, said controller calculating the flow rate of said first, second and third concentrates by integrating said gradients of output flow rate of said first, second, and third concentrates respectively, and controlling the energization of said first, second, and third pumps in accordance with the flow rate of said first, second, and third concentrates respectively in order to regulate the content of said zinc, manganese, and total acid constituents at said zinc, manganese, and total acid constituent set-points respectively.

19. A method of controlling the content of at least one constituent of a phosphate bath comprising a plurality of constituents, by controlling the energization of a pump that replenishes the bath with a concentrate that contains said at least one constituent, comprising a sequence of the following steps:

sensing the amount of said at least one constituent in the bath, filtering data collected during the sensing step to test the data for feasibility and for exponentially smoothing feasible data in accordance with an exponential smoothing algorithm that includes a forgetting factor that is increased each time the collected data is above a predetermined percentage of a constituent set-point, and is decremented upon detection of a predetermined number of consecutive data points below said predetermined percentage, calculating the constituent error between the amount sensed and a set-point, calculating the gradient of said constituent error, determining a gradient of output flow rate of concentrate based on the output inferred by a rule-base under a fuzzy reasoning mechanism that responds to said constituent error and the gradient of said constituent error, calculating the flow rate of the concentrate by integrating said determined gradient, and controlling the energization of the pump in accordance with the flow rate in order to regulate the constituent content in the bath at the set-point.

20. The method of claim 19 wherein said pump is deactivated upon detection of said predetermined number of consecutive data points below said predetermined percentage.

* * * * *